United States Patent
Gombert et al.

(10) Patent No.: US 8,444,820 B2
(45) Date of Patent: May 21, 2013

(54) AQUEOUS COMPOSITION CONTAINING AT LEAST ONE SOLUBLE GELATINIZED ANIONIC STARCH

(75) Inventors: Herve Gombert, Gonnehem (FR); Jerome Klaeyle, Bethune (FR); Claude Quettier, Lambersart (FR)

(73) Assignee: Roquette Freres, Lestrem (FR)

( * ) Notice: Subject to any disclaimer, the term of this patent is extended or adjusted under 35 U.S.C. 154(b) by 242 days.

(21) Appl. No.: 12/743,829

(22) PCT Filed: Nov. 18, 2008

(86) PCT No.: PCT/FR2008/052078
§ 371 (c)(1),
(2), (4) Date: May 20, 2010

(87) PCT Pub. No.: WO2009/071796
PCT Pub. Date: Jun. 11, 2009

(65) Prior Publication Data
US 2010/0243188 A1    Sep. 30, 2010

(30) Foreign Application Priority Data
Nov. 20, 2007    (FR) ..................... 07 59186

(51) Int. Cl.
*D21H 17/28*    (2006.01)
*C12P 19/14*    (2006.01)

(52) U.S. Cl.
USPC ........ 162/175; 162/158; 162/185; 106/207.1; 435/99; 536/102; 127/70

(58) Field of Classification Search
USPC .................. 162/158, 175, 184, 185; 536/102, 536/107, 110; 127/65, 70, 71; 106/162.1, 106/206.1, 207.1, 208.1; 435/99
See application file for complete search history.

(56) References Cited

U.S. PATENT DOCUMENTS

| | | | | |
|---|---|---|---|---|
| 3,251,748 A * | 5/1966 | High et al. | ....................... | 435/99 |
| 3,436,309 A * | 4/1969 | Ottinger et al. | ................. | 435/99 |
| 3,598,622 A | 8/1971 | Maher et al. | | |
| 3,884,853 A * | 5/1975 | Zimmerman | .................. | 524/47 |
| 4,116,770 A * | 9/1978 | Goering et al. | ................. | 127/32 |
| 4,297,144 A * | 10/1981 | Klein et al. | .............. | 106/162.81 |
| 4,387,221 A | 6/1983 | Tessler et al. | | |
| 4,855,354 A * | 8/1989 | Mohler et al. | .............. | 525/54.24 |
| 4,941,922 A * | 7/1990 | Snyder | ........................ | 106/211.1 |
| 5,129,989 A | 7/1992 | Gosset et al. | | |
| 5,393,336 A * | 2/1995 | Foran et al. | ................. | 106/208.1 |
| 5,470,964 A * | 11/1995 | Qin | .................. | 536/20 |
| 5,505,783 A * | 4/1996 | Fitton | ............................. | 127/65 |
| 5,846,786 A * | 12/1998 | Senkeleski et al. | ............. | 435/96 |
| 6,096,524 A * | 8/2000 | Shi et al. | .......................... | 435/99 |
| 6,387,666 B1 * | 5/2002 | Thorne et al. | ................. | 435/102 |
| 2010/0159104 A1 | 6/2010 | Bastien et al. | | |

FOREIGN PATENT DOCUMENTS

| | | |
|---|---|---|
| EP | 0282415 A1 | 9/1988 |
| EP | 0506352 A | 9/1992 |
| EP | 1167434 A1 | 1/2002 |
| FR | 2898897 A1 | 9/2007 |
| GB | 1488921 A | 10/1977 |
| JP | 2003049399 | 2/2003 |
| WO | 8404315 A1 | 11/1984 |
| WO | 0194699 A | 12/2001 |

OTHER PUBLICATIONS

Wongsagonsup Rungtiwa et al: "Zeta potential (zeta) and pasting properties of phosphorylated or crosslinked rice starches", STARCH, Jan. 2005, pp. 32-37, vol. 57, No. 1, XP002486087.
Ohsawa K et al: "Zeta Potential and Surface Charge Density of Polystyrene-Latex; Comparison With Synaptic Vesicle and Brush Border Membrane Vesicle", Colloid Polym Sci Dec. 1986, pp. 1005-1009, vol. 264, No. 12, XP002486086.
Rutenberg M and Solarek D (1984): Starch Derivatives and Uses. In Whistler et al (Ed.) "Starch: Chemistry and Technology" pp. 314-352, Academic Press, Inc.
Scallet B and Sowell A (1967): Hypochlorite-oxidized starches: In Whistler et al (Ed.) "Starch: Chemistry and Technology" pp. 238-393, Academic Press: New York, London, San Francisco.
Radley (Ed.), (1976): "Starch production technology", pp. 456-565, Applied Science Publishers: London.
International Search Report, Dated May 20, 2009, in Application No. PCT/FR2008/052078.
French Search Report, Dated Jul. 2, 2008, in Application No. FR 0759186.

* cited by examiner

*Primary Examiner* — Mark Halpern
*Assistant Examiner* — Dennis Cordray
(74) *Attorney, Agent, or Firm* — Young & Thompson

(57) ABSTRACT

An aqueous composition which is anionic in nature, includes at least one soluble gelatinized anionic starch and at least one insoluble anionic starch. A method of using the composition, in particular for the manufacture of a paper or of a flat board, and the paper or the flat board obtained therefrom, along with various industrial uses such as water treatment or the production of cosmetic products, are also described.

18 Claims, No Drawings

AQUEOUS COMPOSITION CONTAINING AT LEAST ONE SOLUBLE GELATINIZED ANIONIC STARCH

This application is a 371 of PCT/FR08/52078, filed Nov. 18, 2008 and claims priority to French Application No. 0759186, filed Nov. 20, 2007.

The invention relates to an aqueous composition comprising at least one soluble gelatinized anionic starch and, preferably, at least one anionic or nonionic insoluble starch.

It notably relates to an aqueous composition comprising a combination of at least one soluble gelatinized anionic starch and of at least one insoluble anionic starch that is not gelatinized or partially swollen, for the manufacture of paper or flat board.

It also relates, in particular, to the use of a composition according to the invention as a "bulk" adjuvant for the manufacture of paper or flat board. This use makes provision for the addition of a composition according to the invention to the fibrous suspension, with a view to a better retention of the fibers and of the fillers, a better drainage and/or better physical characteristics of the papers and boards obtained.

It also relates to the use of a composition according to the invention in the wet part of the paper-making machine.

It also targets the preparation of a composition according to the invention that has an excellent stability, especially in terms of viscosity, for long storage times, that is to say of several months.

The expression "anionic starch" is understood to mean a chemically modified starch that has an anionic character, expressed in µeq/gram of dry product, measured on a streaming current detector machine, sold by Mütek (measurement known as "SCD"). The anionic charges may be introduced by oxidation (especially starting from an amine oxide such as, for example, "TEMPO" and/or a derivative thereof), by esterification and/or by etherification. The anionic starch is then advantageously characterized by the degree of substitution (DS) which is equal to the average number of substituents per unit of glucose.

The anionic starch within the meaning of the invention is chosen from oxidized starches, starch phosphates, starch sulfates, sulfocarboxylated starches, carboxyalkylated starches, starches modified by n-alkenylsuccinylation, especially n-octenylsuccinylated and n-dodecenylsuccinylated starches or starches esterified with a dicarboxylic acid anhydride.

The expression "insoluble starch" is understood to mean any starch in the form of granules which has, in polarized light, a black cross known as a "Maltese cross". This positive birefringence phenomenon expresses the semicrystalline organization of the granules, which is preserved as long as said starch granules are not hydrated enough to be solubilized. The granules, even when swollen, are considered to be insoluble as long as the birefringence remains.

In contrast, the expression "soluble gelatinized starch" and, more particularly, "soluble gelatinized anionic starch" is understood to mean any anionic starch that is no longer in the granular state, the conversion state of the starch being such that said Maltese cross no longer appears in polarized light.

The expression "stable composition" is understood to mean a composition for which the variation of the viscosity does not exceed 50% of the initial value over 3 months or, better still, over 6 months. Preferably, this variation is less than 25% of the initial value and in particular less than 10%. These values apply to storage at high temperature, that is to say at 35° C., and to storage at low temperature, for example at 5° C.

The compositions of the present invention also have good chemical stability.

The compositions according to the invention are particularly effective for preparing sizing compositions, in particular emulsions for sizing paper in a neutral medium, or compositions containing at least one paper-finishing agent, especially chosen from optical brighteners, dyes and synthetic polymers.

The fibrous suspension to which the composition of the present invention is added during the manufacture of paper, may be a composition derived from high-grade pulps such as those intended for the manufacture of thin papers, such as onion skin papers, glassine papers, banknote papers, cigarette papers, bible papers, tissue papers or similar, or other "fine papers", especially intended for copying or printing writing, up to products commonly known as "tissue" or electrical papers, especially papers known as "capacitor papers".

The invention also relates to filter papers, especially industrial filter papers or filter papers intended for the automotive industry, or certain special papers, especially those containing large amounts of titanium oxide. Among these special papers, mention may be made, for example, of sandpapers, laminated base papers, "decorative" papers, especially structural papers, laminated papers and wallpapers.

The term "paper" is considered here in a generic sense and encompasses all of the qualities mentioned above.

The invention particularly relates to recycled pulps, especially waste paper pulps, for which the technical problems are particularly significant. Specifically, the portion of fibers that are recycled and derived from waste paper is steadily increasing in fibrous compositions.

The invention relates to any closed paper-making circuit, that is to say that employs limited amounts of fresh water and makes use of water that is recycled and loaded in various ways.

The recycling and the degradation of the fiber which results therefrom have the major consequence of rendering the paper pulps less and less receptive to cationic adjuvants, whether they are of synthetic or natural origin, which are widely used for flocculation purposes and for improving the results of the machine, for example in terms of drainage, of retention of fibers and/or of fillers, of the speed of the machine, etc. The development of the circuits, linked especially to environmental aspects, means that a person skilled in the art is permanently searching for improvements that relate thereto.

The desired improvements may also more directly affect the physical properties of the paper or of the flat board, the mechanical or optical properties or else, properties relating to the feel, to "linting", to "dusting", to chalking and/or to the printability.

There is thus a need to improve the receptivity of paper pulps to commonly used cationic agents.

There is a similar need in the manufacture of thin papers, for which it is becoming imperative to improve all of the manufacturing conditions.

One known solution for enhancing said receptivity to cationic agents consists in treating the pulp with an adjuvant that has an anionic nature, especially with an anionic starch.

For the preparation of anionic starches, anionic substituents are introduced into the starch molecule via functional reactants preferably chosen from the following:

In the case of starch phosphonates, chloroaminoethane diethyl phosphonic acid,

In the case of starch sulfates, sulfamic acid, sulfamates or else electron donor $SO_3^-$ complexes such as $SO_3^-$ TMA (trimethylamine) or $SO_3^-$ pyridine, In the case of sulfoalkylated starches, 2-chloroethanesulfonates and 3-chloro-2-hydroxypropanesulfonate;

In the case of carboxyalkylated starches, the salts of 1-halocarboxylic acids such as sodium monochloroacetate or sodium chloropropionate, lactones such as propionolactone or butyrolactone, or acrylonitrile (reaction followed by a saponification);

In the case of anionic starch esters: acid anhydrides such as maleic, succinic and phthalic anhydrides; and In the case of sulfocarboxylated starches, 3-chloro-2-sulfopropionic acid.

Attaching a reactant bearing an anionic group to starch is well known per se. Reference will be made, in particular, to the following reference works:

"Starch: Chemistry and Technology", Whistler et al., vol. II (Industrial Aspects), 1967, Academic Press, "Starch Production Technology", J. A. Radley, 1976, Applied Science Publishers Ltd. London, "Starch: Chemistry and Technology", Whistler et al., $2^{nd}$ edition (1984), Academic Press.

The reaction may be carried out in the wet phase, on a suspension of starch, in an aqueous medium. U.S. Pat. No. 4,387,221 discloses examples of modifications. The reaction may also be carried out in a solvent medium, but equally in a dry phase, in the presence of a catalyst of alkaline nature.

In order to monitor the reaction, the degree of substitution (DS) of the resulting product is measured.

Modification in the solvent phase or in the dry phase is appropriate in the case where the solubility in water becomes high, that is to say when the DS increases sufficiently.

The attachment may also be carried out during the solubilization of the starch under the aforementioned conditions.

A major difficulty of the use of known anionic starches is linked to the granular structure of the anionic starches on the market, their low DS and their initial insolubility. Such agents, in powder form containing only their water of constitution, require a cooking operation, in a tank or under live steam pressure, carried out at the site of use. This operation appears even more onerous since it is added, in most cases, to the preparation of cationic adjuvants which requires the installation of specific equipment.

Applications EP 1 167 434 and WO 01/94699 illustrate the drawbacks of such onerous processes.

Another major difficulty lies in the preparation of anionic aqueous starchy compositions in the form of colloidal solutions that are both sufficiently concentrated and stable over time, especially in terms of viscosity. Whether said colloidal solution is obtained by cooking and/or by obtaining a sufficient DS, it is very difficult, or even impossible, to prepare stable solutions of anionic starch(es) that have a dry matter content greater than 10%. Their shelf life is generally insufficient in view of an industrial use. It is generally considered that a starch solution can no longer be used when it can no longer be pumped.

Thus, to the knowledge of the applicant, there are no means that make it possible to have aqueous compositions of anionic starches that are ready to use without a cooking operation, that are sufficiently concentrated and stable within the meaning of the invention, that is to say having a sufficient stability, over time, of the viscosity and of the degree of substitution.

The solutions proposed to date are not satisfactory regardless of the DS.

It is thus meritorious of the applicant to have found a means for providing concentrated compositions of anionic starch(es) that are stable, ready to use, and that have a low enough viscosity in order to be able to be pumped.

Indeed, the work of the applicant made it possible to determine that the technical problem could be solved by virtue of a particular combination of soluble anionic starches and of nonionic or anionic starches that are insoluble at ambient temperature.

One subject of the present invention is therefore an aqueous composition containing:

at least one soluble gelatinized anionic starch having a charge density between $-150\,\mu eq/g$ dry and $-6000\,\mu eq/g$ dry, preferably between $-200$ and $-6000\,\mu eq/g$ dry, and at least one anionic or nonionic insoluble starch, said composition having a total content of starchy dry matter greater than 10%, preferably between 15% and 70%.

The total content of starchy dry matter of the compositions is preferably between 21 and 65%, in particular between 25 and 55%.

Another subject of the present invention is an aqueous composition containing at least one succinylated soluble gelatinized anionic starch, having a charge density, preferably provided by the succinyl groups, between $-150\,\mu eq/g$ dry and $-6000\,\mu eq/g$ dry, preferably between $-200\,\mu eq/g$ dry and $-6000\,\mu eq/g$ dry, said composition having a total content of starchy dry matter greater than 10%, preferably between 15% and 70%.

Such high dry matter contents are obtained by virtue of the reduction of the molecular weight of the soluble anionic starches, in particular by enzymatic hydrolysis, especially with α-amylases.

The anionic or nonionic insoluble starch is generally either an ungelatinized starch or a partially swollen starch. It is preferably an insoluble anionic starch.

Processing based on these rules makes it possible to very easily exceed 10% or even 15% of dry matter. The dry matter contents are commonly 21%, 25% or more, which permits satisfactory commercialization conditions. They may achieve, in certain cases, values ranging up to 65%, or even 70%, especially by virtue of the solubilization technique as described in French patent application FR 2 898 897.

The starch that is soluble in water, at ambient temperature, of the compositions of the present invention may be obtained by thermal and/or chemical solubilization, and/or by obtaining a sufficient degree of substitution.

The applicant has observed that it was possible to obtain the stable and pumpable starchy aqueous compositions of the present invention with relatively low amounts of insoluble anionic starch. Specifically, compositions having a sufficient stability were obtained once the portion of ungelatinized or partially swollen insoluble anionic starch represented at least 1% of the total weight (on a dry/dry basis) of the sum of the soluble gelatinized anionic starch and the anionic or nonionic, ungelatinized or partially swollen, insoluble starch.

It is sometimes advantageous to use a higher proportion of insoluble starch, in particular at least equal to 10% and at most equal to 60% of the total weight of starch (on a dry/dry basis). A proportion at least equal to 25% and at most equal to 55% of the total weight of starch (on a dry/dry basis) often makes it possible to meet as best as possible the set requirements.

The soluble and insoluble starches used in the aqueous compositions of the present invention may be derived from cereal starches, especially wheat and corn starches, including those derived from varieties rich in amylose or in amylopectin, from tuber starches such as potato and cassava starches, or from leguminous starches such as pea or lupin starches.

It is of course possible to use mixtures of starches of various origins.

In one preferred embodiment of the compositions of the present invention, the soluble anionic starch and the insoluble starch, when it is also an anionic starch, bear the same anionic substituents. These substituents are preferably succinyl groups attached by esterification of the hydroxyl groups by succinic anhydride.

The soluble anionic starches used in the present invention preferably have a negative charge density between −250 and −5500 µeq/g dry, preferably between −400 and −5000 µeq/g dry, more preferably still between −450 and −4500 µeq/g dry.

It is generally considered that the initial viscosity (before storage) of the aqueous compositions of the present invention is satisfactory from the point of view of their envisaged use, in particular for the manufacture of paper and board, when the Brookfield viscosity, measured at 25° C. and 20 rpm is between 200 and 10 000 mPa·s, preferably between 250 and 8000 mPa·s, and in particular/between 350 and 7000 mPa·s.

The applicant has also developed a novel highly advantageous process for preparing the soluble fraction of the starchy material of the compositions of the present invention.

During tests carried out, the applicant in fact observed that it was very easy to obtain starches having a desired charge density via a process of enzymatic digestion of anionic starches by α-amylases, when the process of the prior art was completed with a supplementary step of active cooling of the solution of anionic starch resulting from the enzyme deactivation step. In other words, the applicant observed that it was possible to obtain higher charge densities by cooling the hot aqueous composition of soluble anionic starch exiting from the thermal deactivation step of the enzyme for example by means of a heat exchanger so as to bring the temperature very rapidly, in only a few minutes, to a temperature close to ambient temperature.

Consequently, one subject of the present invention is a process for preparing a composition according to the invention, characterized in that it comprises:
- a step of enzymatic treatment of an anionic starch with an α-amylase,
- a step of deactivation of the α-amylase by heating the composition obtained in the preceding step at a temperature at least equal to 130° C.; and
- a step of active cooling of the composition obtained in the preceding step, to a temperature below 50° C., preferably below 35° C., in less than 10 minutes preferably in less than 5 minutes.

The above steps of digestion, deactivation and cooling result in the soluble anionic fraction of the starchy material of the compositions of the present invention.

The step of thermal deactivation is preferably carried out in a "Jet-Cooker" type apparatus.

Indeed, as is shown by the comparison of Examples 1 and 2 below, the slow cooling of the composition resulting from the step of thermal deactivation of the enzyme, for example by simple dissipation of the heat over several tens of minutes, results, completely surprisingly, in a starch that has a degree of substitution and a charge density that are considerably lower than an equivalent process having a final step of rapid cooling.

Another subject of the present invention is a process for preparing a starchy aqueous composition comprising:
- a step of anionization of a starch, preferably by carboxyalkylation, in particular by carboxymethylation, or by esterification, in particular by succinylation;
- a step of gelatinization of an anionic starch; and
- a step of reducing the molecular weight of said gelatinized starch, preferably by enzymatic digestion, especially by an α-amylase, the various steps being carried out successively or simultaneously, preferably simultaneously, and the process being characterized by the fact that it is carried out in a drum dryer.

Another subject of the present invention is a process for preparing a starchy aqueous composition comprising:
- a first step of anionization of a starch, preferably by carboxyalkylation, in particular by carboxymethylation, or by esterification, in particular by succinylation; and
- a second step of anionization of the starch resulting from the first step, preferably by carboxyalkylation, in particular by carboxymethylation, or by esterification, in particular by succinylation, this second step being carried out in an adhesive phase.

The processes of the present invention are advantageously continuous processes.

For the gelatinization steps, the temperature of the reactor is preferably barely higher than the gelatinization temperature of the starch. The temperature in the reactor is thus chosen as a function of the nature of the starch treated, in order to ensure its solubilization under the best conditions.

The pressurized cooker, preferably mounted inline, downstream of the reactor, will have the role of completing the cooking state and the attachment of the reactant, of providing, via a thermal effect, a better stability and of inhibiting the enzyme. It is recommended to supply it with steam at a sufficient pressure.

The device as described in French patent application FR 2 898 897 constitutes one solution that is perfectly suited to the conversions envisaged within the context of the present invention. It enables the use of a small amount of insoluble anionic starch.

In the process using drum dryers to carry out, simultaneously, the solubilization, the anionization and the reduction of the molecular weight, it is necessary to supply the device with superheated steam at a sufficient pressure, that is to say at least equal to 5 bar, preferably greater than 7 bar, in order to ensure the solubilization of the starchy material and obtain, at the outlet, a homogeneous dehydrated sheet.

The applicant has developed another advantageous variant of the process that enables high degrees of substitution to be obtained. This variant comprises, in addition to the steps described above, a supplementary reaction step, in the adhesive phase, defined as a "super-anionization".

The process thus improved for obtaining aqueous anionic compositions according to the invention is characterized in that it comprises at least two anionization phases, that is to say two steps of attaching one or more anionic reactants to the soluble gelatinized part, the second at least having compulsorily taken place in the adhesive phase.

This process not only makes it possible to obtain high degrees of substitution, but also offers great flexibility and overall reaction yields that are very attractive.

The applicant has not encountered any obstacle in increasing the number of modifications in the adhesive phase, thus giving access to the highest charge densities.

The applicant thus considers that it is entirely possible to solve the technical problem linked to the preparation of a stable and high-performance aqueous anionic composition according to the propositions described above.

The aqueous compositions of the present invention are particularly advantageous as "bulk" adjuvants added to the fibrous suspension during the manufacture of paper, such as retention agents, drainage agents and/or agents intended for improving the physical characteristics of the papers.

The use of a composition according to the invention is beneficial, especially by virtue of the possibility of using a high molecular weight anionic or nonionic insoluble starch and of attaining the best physical characteristics.

The composition according to the invention, as a bulk additive, may be introduced into the suspension of fibers at any point of the circuit, from slushing in the pulper up to the head box, not excluding any apparatus capable of taking part therein, especially the pulp tank and the chests.

The use of the compositions according to the invention is also advantageous in the wet part of the paper-making machine, via any suitable technique such as, for example, spraying.

Moreover, it has been observed that the composition according to the invention may be involved in the preparation of sizing agent compositions, especially for obtaining emulsions intended for sizing paper in a neutral medium, and/or the preparation of compositions containing at least one agent chosen from optical brightener, dyes and synthetic polymers.

Although the reduction of the molecular weight of the anionic starches may be obtained by any means known to a person skilled in the art, especially by acid hydrolysis and an oxidation, usually controlled oxidation, or by dry roasting (dextrins), it is also possible to envisage thermal means, known to a person skilled in the art under the name of Hot Moisture Treatment (HMT) or annealing, thermochemical means, mechanical means or else chemical means.

Other modifications may be combined, for example via nonionic substituents such as propylene oxide, or via cationic reactants, that result in amphoteric starches. In the latter case, it goes without saying that the starch must remain anionic overall.

The anionic or nonionic, ungelatinized or partially swollen, insoluble starches are also subjected to complementary modifications before, during or after the anionic modification. They may be subjected to chemical operations such as oxidation, acid hydrolysis or etherification, thermal, thermomechanical or thermochemical operations, dry roasting in particular.

It may also be envisaged to make use, for the insoluble portion, of anionic or nonionic starches derived from any crosslinking operation known to a person skilled in the art.

The compositions of the present invention may also contain other additives, for example:
  thickeners and/or suspending agents such as xanthan gums, the use of which is described in international patent application WO 84/04315, alginates, agar agar, gellan gum, karaya gum, gum arabic, carob gum, guar gum, gum tragacanth, carrageenans or galactomannans;
  modified or unmodified, powdered or micronized celluloses, such as hemicelluloses and cellulose ethers, for instance carboxymethyl celluloses, hydroxyethyl celluloses, hydroxypropyl celluloses and derivatives;
  various fillers, in the form of powder, nanoparticles or nanofibers, such as clays, silicates, aluminosilicates or other metallic derivatives in particular.

Advantageous effects, especially in terms of stability, may be obtained by the presence of alkaline agents in the compositions of the present invention.

The essential aspects of the present invention, relative to the production of compositions according to the invention and to their use for the manufacture of paper, will be described in a more detailed manner with the aid of the following examples which are in no way limiting.

It should also be remembered that the compositions according to the invention may be worthy of interest for the preparation of paper sizing compositions or of compositions containing at least one paper finishing agent, especially chosen from optical brighteners, dyes and synthetic polymers.

They are also capable of being used for the treatment of papermaking and non-papermaking industrial waste waters, and fermented and unfermented beverages and waters, intended for human or animal consumption.

Similarly, they may advantageously be involved in the preparation of cosmetic products, various chemicals, for example, housekeeping and cleaning products, detergents, metal treatment agents.

They are also used for making adhesive compositions, in particular intended for bonding cellulose materials, such as, for example, corrugated board, for the treatment of leathers and textile products, especially textile products that are woven, knitted or of the "tissue" type obtained by a wet, dry or molten route.

They are also capable of usefully participating in the manufacture of composite or non-composite products, used in the wood industry, especially pressed woods and plywoods, the construction industry, especially cements, concretes, bricks or tiles, the glass industry, especially fibers and derivatives, the ceramics industry, in the extraction of ores or of various separations of mineral materials, in the extraction of oil or in the agglomeration, for example, of coal, of charcoal or of sand, especially of foundry sand.

EXAMPLE 1

This example describes the preparation of an anionic starch composition according to the prior art.

A colloidal solution of a gelatinized anionic starchy material (succinylated potato starch having a degree of substitution (DS) of 0.07) obtained by a conventional method described in the literature, is put into solution in water at a concentration of 9% dry matter (DM). The aqueous composition obtained has a Brookfield viscosity of 8000 mPa·s, measured at 25° C. and at 20 rpm. Said viscosity changes very rapidly. After 48 hours of storage it can no longer be measured.

Prepared in the form of a milk having 17% DM, it supplies a continuous reactor which also receives 0.6%, by volume relative to commercial starch, of an α-amylase (Fungamyl 800L-Novozymes). The temperature for this gelatinization step is 60° C., the average residence time is 20 minutes.

The enzyme is inhibited by passing into a Jet-Cooker at 130° C. (thermal deactivation).

The aqueous starch solution obtained has a DM of 11% and has a viscosity of 1030 mPa·s. The converted starchy material displays a charge density, measured on the "streaming current detector" device, sold by the company "Mütek", of −133 µeq/g dry (SCD) and a degree of substitution of 0.023.

EXAMPLE 2

The above process was repeated except that after inhibiting the enzyme by heating at a temperature of 130° C., the aqueous solution obtained was passed into a heat exchanger in order to cool the colloidal solution as rapidly as possible to a temperature below 35° C.

The implementation of this active and rapid supplementary cooling step makes it possible, all reaction conditions otherwise being equal, to result in a much higher reaction yield. Specifically, the product obtained has a charge density of −420 µeq/g dry, i.e. an ionic charge more than three (3) times higher than that of the anionic starch prepared in example 1. Its DS is 0.063 (×2.7).

The novel process comprising a rapid cooling step is significantly better performing.

EXAMPLE 3

Here, the effect is illustrated of a second anionization reaction carried out with a substitution reactant identical to that from a first step, on a base starch converted first under the conditions of the prior art, in this case on the product obtained in example 1.

The necessary amount of colloidal solution obtained in example 1 is transferred to a reactor equipped with a pH control loop. The redox medium is adjusted to neutrality, then the pH to 8.5 using a solution of sodium hydroxide at a concentration of 3.5% and the reaction medium is kept under pH control.

5% of succinic anhydride, by dry weight relative to the dry starch, is added over one hour under pH control at 8.5. At the end of the addition, the reaction is left for 30 minutes before neutralizing to pH 6.

The product obtained has a charge density of −495 µeq/g dry and a DS of 0.08.

EXAMPLE 4

The process from example 3 is repeated, modifying the amount of succinic anhydride and the time necessary for the introduction, that is to say 10% is added over 2 hours. The product obtained has a charge density of −907 µeq/g dry and a DS of 0.13.

EXAMPLE 5

A supplementary step of anionization of an anionic starch obtained by a process as described in example 2 is carried out with increasingly high amounts of succinic anhydride.

Thus, an anionic starch having a DS of 0.05 and a charge density of −400 µeq/g dry is reacted with:

19% (on a dry/dry basis) over 3 hours 30 minutes (example 5), or

55% (on a dry/dry basis) over 10 hours (example 6), or

150% (on a dry/dry basis) over 25 hours (example 7).

The analyses lead to the following results (presented here in comparison with those obtained in examples 3 and 4):

|  | Base starch 1 SCD = −135 µeq/g DS = 0.023 | | Base starch 2 SCD = −400 µeq/g DS = 0.05 | | |
| --- | --- | --- | --- | --- | --- |
|  | Succinic anhydride (% on a dry/dry basis) | | | | |
|  | 5 (ex. 3) | 10 (ex. 4) | 19 (ex. 5) | 55 (ex. 6) | 150 (ex. 7) |
| Charge density (SCD) | −495 | −907 | −1500 | −3500 | −4240 |
| DS | 0.08 | 0.13 | 0.29 | 0.74 | 1.80 |

Two successive modifications make it possible to achieve a very wide range of DS values and of charge densities.

It is noted that the use of the procedure from example 2, with rapid cooling, allows an excellent attachment of the reactant in the adhesive phase, which gives it an undeniable advantage in terms of environment and ecology.

EXAMPLE 6

This example illustrates an anionization reaction of a starchy material in a drum dryer.

In the feed chamber of the drum dryer, a potato starch milk containing 30% of dry matter is prepared and 21% of dry sodium monochloroacetate, relative to the dry potato starch, is added.

The drum dryer, heated by steam at 10 bar is fed with the mixture thus prepared by providing in line, before the inlet to the drum, the stoichiometric amount of sodium hydroxide relative to the sodium monochloroacetate. The reaction takes place in the drum. It is accompanied by a sufficient dehydration resulting in a sheet which is then milled. The milled product is dispersed in water having 10° TH [French degree of hardness], containing 10% dry matter, with stirring for 30 minutes.

The solution has a viscosity of 6500 mPa·s, measured at 25° C. and at 100 rpm, on a Brookfield viscometer.

The charge density is −1305 µeq/g dry, the DS is 0.24.

EXAMPLE 7

The implementation is, in all respects, identical to that from example 6. Only the amount of sodium monochloroacetate and of sodium hydroxide is doubled, the potato starch milk thus receiving 42% (on a dry/dry basis) of sodium monochloroacetate. The product dispersed in water, under the same conditions as before, has a Brookfield viscosity of 5100 mPa·s.

The charge density is −1769 µeq/g dry and the DS is 0.39.

EXAMPLE 8

This example illustrates the preparation of a dicarboxylic anionic size. Introduced, into a potato starch milk having 35% DM, placed under pH control at 2 (hydrochloric acid), is 30% of sodium periodate in the form of a solution at pH 2 over 40 minutes. The reaction is then maintained for one hour.

The mixture is neutralized to pH 8 with dilute sodium hydroxide. It is filtered and washed, before switching the product back into suspension at 15% DM, 5° C. and at pH 5.0. With control at this pH using dilute sodium hydroxide, 10% of aqueous hydrogen peroxide solution then, over 2 hours, 27% of sodium chlorite, are added.

The reaction, carried out over 18 hours, is stopped by neutralization at pH 10 with sodium hydroxide. Filtration and washing. It is put back into a milk containing 10% DM, the pH is adjusted to 6 and it is heated until a homogeneous size is obtained.

The product has a charge density of −1980 µeq/g dry.

EXAMPLE 9

A potato starch is succinylated so as to have an ester index of 3.5%. It then undergoes, in a reactor whose temperature is set at 63° C., an enzymatic conversion (Fungamyl 800L, α-amylase) over 20 minutes. The solution, containing 14.95% DM, has a Brookfield viscosity, measured at 25° C., of around 1550 mPa·s at 20 rpm and of 1200 mPa·s at 100 rpm. The charge density is −249.7 µeq/g dry.

From this fresh solution, several samples of 500 g each (i.e. 74.75 g of dry product) are withdrawn, to which are added, with stirring at 450 rpm, various amounts of a powdered maleo-sulfonated corn starch, the charge density of which is −594.4 µeq/g dry. Insoluble at ambient temperature, it contains around 10% of water of constitution.

Test 2 is repeated, respectively adding 0.05 (test 2a) and 0.1% (2b) of powdered xanthan gum. After one week, then one month, an optional settling is observed that is expressed by:

$$SI(\text{index}) = 100 - (\text{height of deposition/total height}) \times 100$$

The Brookfield viscosity is also measured. The results are presented in the following table:

| Succinylated starch solution | Powdered maleo-sulfonated corn starch | Brookfield viscosity 20 rpm (mPa·s) | | | SI (%) Settling index | |
|---|---|---|---|---|---|---|
| | | T = 0 | 7 days | 30 days | | |
| 500 grams | 25 grams (1) | 3000 | 3800 | 3700 | 7 | 7 |
| 500 grams | 50 grams (2) | 4300 | 5200 | 3500 | 7 | 14 |
| 500 grams | 50 grams (2a) | 4500 | 6500 | 6000 | 3 | 3 |
| 500 grams | 50 grams (2b) | 4000 | 6000 | 5500 | 1 | 1 |
| 500 grams | 75 grams | 6600 | 4500 | 3500 | 13 | 14 |
| 500 grams | 100 grams | 10 000 | 12 500 | 8500 | 0 | 0 |

For the tests carried out at 25, 50 and 75 g (i.e. respectively around 24%, 37.6% and 47.45% of powdered anionic starch relative to the total dry starch), there is settling. The problem is resolved for 100 g (54.63% of the total on a dry/dry basis). This result is obtained at the expense of a substantial increase in the viscosity.

Xantham gum, per 50 g of insoluble anionic corn starch, significantly improves the stability.

EXAMPLE 10

Other tests carried out with similar compositions containing 75 g of maleo-sulfonated corn starch per 500 g of anionic solution, make it possible to comprehend the influence of the storage temperature (5 and 35° C.) on the Brookfield viscosity measured at 20 rpm, over 3 weeks:

| | Brookfield viscosity 20 rpm (mPa·s) | | | | |
|---|---|---|---|---|---|
| | initial | 24 hours | 1 week | 2 weeks | 3 weeks |
| Test 3 - 5° C. | 1400 | 2400 | 2500 | 2500 | 2400 |
| Test 3 - 35° C. | | 800 | 750 | 750 | 650 |

The test 2, containing 50 g of maleo-sulfonated corn starch, shows that it is desirable to add a suspending agent such as xanthan gum. A proportion of 75 g of powder per 500 g of solution at 14% DM provides a remarkable stability, at low or high storage temperature.

EXAMPLE 11

Two compositions according to the invention are assessed with respect to implementations of anionic starches corresponding to the prior art, being combined with a cationic starch and/or a polyaluminum chloride (PAC).

More specifically, the test PVP1 (blank) comprises only PAC whereas the test PVP2 contains cationic starch (HI-CAT 5163AM) and PAC.

The tests PVP3 and PVP4 are in accordance with European patent EP 0 282 415, providing the separate but simultaneous addition (known as a "DUALE" technique), in solution, of cationic starch (1% dry) and of anionic starch (0.2% dry).

The same polyaluminum chloride (0.2% dry) is used. The test PVP3 relates to a succinylated anionic corn starch, and the test PVP4 to a maleo-sulfonated starch.

The use of PAC and of the "DUALE" technique, separately or in combination, is representative of the prior art. Added thereto is a test that only differs from tests PVP3 and PVP4 by the fact that the maleo-sulfonated anionic starch from test PVP4 is introduced into the pulp in the insoluble state (test PVP4a).

The compositions according to the invention (tests PVP5 and PVP6) correspond to the preparations 2a and 2b from example 9. Their dry matters are respectively 20.5 and 20.1%. Their charge densities are comparable and are in the vicinity of −275 µeq/g dry.

The comparisons are made on a pilot paper-making circuit that reproduces the machine operation. Regular withdrawals give access to major data such as total retention and the COD measured on the waters under the wire.

The drawing of paper handsheets (200 g/m$^2$, for an optimal assessment of the physical characteristics) allows conventional measurements, such as the internal cohesion (Scott Bond), a representative physical measurement, and the ash (at 450° C.)

The pulp is derived from 100% recycled waste paper. Barely receptive to cationic polymers, it has a conductivity of 4000 µS/cm approximately and a pH close to 7.

Added, according to defined sequences and in this order, are: 1% cationic starch (HI-CAT 5163AM), then 0.2% dry anionic starch, and 0.2% dry weight of polyaluminum chloride (PAC 18), relative to the dry pulp.

| test | | COD (mg/l) | Total retention (%) | Scott Bond (J/m$^2$) | Ash (%) |
|---|---|---|---|---|---|
| PVP1 | Blank (PAC) | 842 | 90.9 | 423 | 5.54 |
| PVP2 | Cationic + PAC | 782 | 92.8 | 436 | 6.63 |
| PVP3 | +succinylated | 834 | 91.8 | 454 | 6.47 |
| PVP4 | +maleo-sulfonated (sol.) | 768 | 92.5 | 444 | 6.69 |
| PVP4a | +maleo-sulfonated (ins.) | 870 | 90.8 | 448 | 6.21 |
| PVP5 | 500/50/0.05% | 772 | 92.8 | 495 | 6.60 |
| PVP6 | 500/50/0.1% | 642 | 93.7 | 480 | 6.80 |

The most appealing interpretation consists in comparing the best results presented by the prior art, i.e. those of test PVP4, with those obtained with the compositions of the invention (PVP5 and PVP6):

The results of tests PVP4 and PVP5 are of the same level in terms of COD, retention and ash. On the other hand, at the same time, the composition according to the invention provides an advantage of more than 10% in terms of internal cohesion, which is significant. This increase can be attributed, at least partially, to the possibility offered by the invention of adding high molecular weight insoluble anionic starches.

Beyond that, the test PVP6 provides, compared to test PVP4, significant savings in terms of COD (−16.4%), retention (+1.2 points), internal cohesion (+8.1%) for a slightly higher ash content (+3%).

A person skilled in the art knows that, most generally, characteristics such as retention and ash change in the opposite way to the internal cohesion. He will be sure to highlight the advantage of the results presented, and also that of a drop in the chemical oxygen demand (COD).

EXAMPLE 12

The composition according to the invention of use in test PVP6 of example 11 is compared with another composition according to the invention, produced from the colloidal solution 2 from example 9, on which a second reaction known as an "over-anionization" reaction is carried out, in accordance with the procedure described in example 3.

This composition, the subject of test PVP7, differs from the first in that it uses 75 g of powder and not 50 g, also receiving 0.1% of xanthan gum. It has 29.1% DM and has a charge density of −539.2 μeq/g dry.

Added to a waste paper pulp similar to that from example 11, according to defined sequences and in this order, are 0.4% of anionic composition according to the invention, considered on a dry basis, 0.8% of cationic starch (HI-CAT 5163AM), and 0.2% dry of polyaluminum chloride (PAC 18), considered relative to the dry pulp.

The manipulations are identical to those described in example 11, especially as regards the desired grammage of 200 g/m².

|  |  | COD (mg/l) | Total retention (%) | Scott Bond (J/m²) | Ash (%) |
|---|---|---|---|---|---|
| PVP6 | 500/50/1% | 724 | 93.5 | 479 | 6.73 |
| PVP7 | 500/75/1% | 670 | 94.7 | 518 | 6.83 |

For a slightly higher ash content (+1.5%), the composition comprising an "over-anionized starch", by virtue of two distinct phases of anionic modification (PVP7) gives, for a COD that is reduced by 7.5%, a retention (+1.2 points) and an internal cohesion (+8%) that are substantially improved, when compared to an anionic starch resulting from a single conversion (PVP6).

It is possible to conclude in the same way as for example 11, by highlighting the gain achieved over all of the criteria used.

It may reasonably be assumed and expected that the positive effects observed in examples 11 and 12 can be combined.

Finally, it should be highlighted that the dry matter achieved here, very close to 30% without it being necessary to exploit all the possibilities offered by the invention, has an undeniable commercial advantage.

The invention claimed is:

1. An aqueous composition for the manufacture of paper or flat board as a bulk adjuvant comprising:
   at least one soluble gelatinized anionic starch having a charge density of between −150 μeq/g dry and −6000 μeq/g dry, and
   at least one anionic or nonionic insoluble starch,
   said composition having a total content of starchy dry matter greater than 10%.

2. The composition as claimed in claim 1, wherein the total content of starchy dry matter is between 21% and 65%.

3. The composition as claimed in claim 1, wherein the insoluble starch is an anionic starch.

4. The composition as claimed in claim 1, wherein the anionic or nonionic insoluble starch represents at least 1% by weight (on a dry/dry basis) of said total content of starchy dry matter.

5. The composition as claimed in claim 1, wherein the soluble gelatinized anionic starch has a negative charge density of between −250 and −5500 μeq/g dry.

6. The composition as claimed in claim 1, which has a Brookfield viscosity, measured at 25° C. and 20 rpm, of between 200 and 10 000 mPa·s.

7. The composition as claimed in claim 1, wherein the soluble gelatinized starch is chosen from succinylated starches.

8. The composition as claimed in claim 1, wherein the insoluble starch is an anionic insoluble starch chosen from succinylated starches.

9. The composition as claimed in claim 1, wherein the at least one soluble gelatinized anionic starch has a charge density of between −200 μeq/g dry and −6000 μeq/g dry.

10. The composition as claimed in claim 1, wherein the total content of starchy dry matter is comprised between 15% and 70%.

11. The composition as claimed in claim 4, wherein the anionic or nonionic insoluble starch represents from 10 to 60% by weight (on a dry/dry basis) of said total content of starchy dry matter.

12. The composition as claimed in claim 6, which has a Brookfield viscosity, measured at 25° C. and 20 rpm, of between 350 and 7 000 mPa·s.

13. A process for preparing a composition as claimed in claim 1, comprising:
   a step of enzymatic treatment of an anionic starch with an α-amylase,
   a step of deactivation of the α-amylase by heating the composition obtained in the preceding step at a temperature at least equal to 130° C.; and
   a step of active cooling of the composition obtained in the preceding step, to a temperature below 50° C. in less than 10 minutes,
   a step of adding at least one anionic or nonionic insoluble starch.

14. A process for manufacturing paper or flat board comprising adding a composition as claimed in claim 1 to the fibrous suspension during the manufacture of the paper or flat board.

15. The process as claimed in claim 14, wherein said composition is introduced into the wet part of the paper-making machine.

16. The process as claimed in claim 15, wherein said composition is introduced into the wet part of the paper-making machine by spraying.

17. The process as claimed in claim 13, wherein the step of active cooling the composition is carried out at a temperature below 35° C.

18. The process as claimed in claim 13, wherein the step of active cooling the composition is carried out in less than 5 minutes.

\* \* \* \* \*

UNITED STATES PATENT AND TRADEMARK OFFICE
CERTIFICATE OF CORRECTION

PATENT NO.       : 8,444,820 B2  
APPLICATION NO. : 12/743829  
DATED            : May 21, 2013  
INVENTOR(S)      : Gombert et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 244 days.

Signed and Sealed this
Eighth Day of September, 2015

Michelle K. Lee
*Director of the United States Patent and Trademark Office*